Patented Apr. 16, 1935                                               1,998,133

UNITED STATES PATENT OFFICE 1,998,133

DEVICE AND METHOD FOR CONTROLLING CIRCUITS BY LIGHT SENSITIVE MEANS

Heinrich H. Geffcken and Hans R. Richter, Leipzig, Germany, assignors to Radio Patents Corporation, New York, N. Y., a corporation of New York Application September 24, 1931, Serial No. 564,744
In Germany September 25, 1930

8 Claims. (Cl. 178—7)

Our invention relates to a method of and means for controlling electric circuits in accordance with the amount of light reflected from a surface and in particular to a novel system of electric picture transmission.

There are a great number of practical applications utilizing photo-electric control devices responsive to the amount of light reflected from an object, such as the testing of color grading in paper manufacture, the sorting and segregating of articles such as cigars, the cutting of material according to pre-determined markings and the like. An outstanding application is the use in the electrical transmission of pictures. In many cases of this type it is often required to produce a controlling photo-electric impulse only during the darkened condition of the photo-electric cell, contrary to the usual methods of producing a varying photo-electric output current according to the variations of the intensity of the light rays controlling the photo-electric device. In order to produce a controlling current impulse during the dark state only or the illuminated state, respectively, of the photo-electric device a variety of more or less complicated circuit arrangements such as balanced circuits have been suggested, requiring in most cases two or more light sensitive cells accurately matched in advance. The object of our invention consists in providing a new device of the character described, which is simple in construction and easy to operate and free from the disadvantages inherent in similar systems known in the prior art.

A more specific object of our invention is to provide a light chopping means in connection with a photo-electric scanning system operated by the amount of reflected light from an object, in which output carrier currents are produced only during the dark condition of the photo-electric device e. g. by dark portions on the object under test or scanning.

These and further objects of our invention will become more apparent from the following description taken with reference to the accompanying drawing of which:

Figure 1:
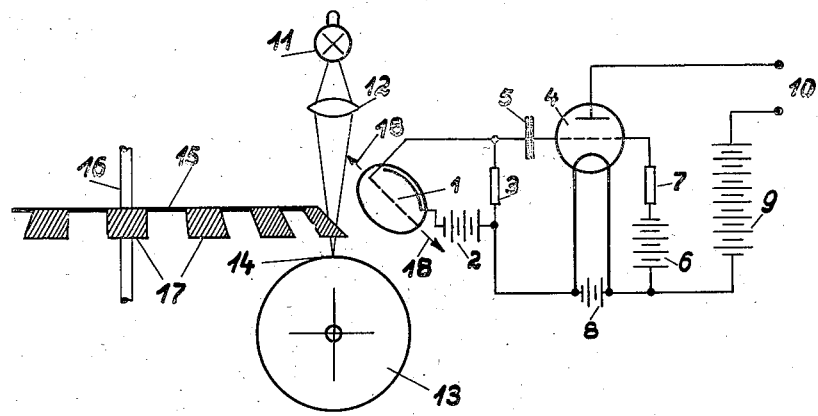
Figure 1 is a diagrammatic representation of a photo-electric scanning system embodying the novel feature of the invention.

Referring to Figure 1, this illustrates the underlying principle of the invention. We have shown a light sensitive cell of ordinary type comprising a light sensitive electrode or cathode and a co-operating anode, both electrodes being inserted in a known manner in an electric circuit completed by a potential source 2 and a resistance 3. The latter serves to control the grid of an ordinary 3-electrode vacuum tube 4 and for this purpose is connected between the grid and the cathode of the tube with a condenser 5 inserted in the grid lead serving as a coupling means. We have furthermore shown a battery 6 in series with a resistance 7 connected between the grid and cathode for applying proper grid operating biasing potential for the tube. At 8 and 9 we have shown the cathode heating and anode batteries, respectively, connected in the usual manner. It is understood that any type of amplifying tube may be substituted for the 3-electrode tube 4 as shown, a pentode or five element tube being preferably used and connected in the customary manner. The control device to be actuated responsive to the amount of illumination upon the photo-electric tube I, such as a relay is connected in the output circuit of tube 4 at the terminals 10 as shown. In the case of a picture transmission system, an amplifier may be provided with its input connected to the output terminals 10, as is readily understood.

The scanning system comprises a light source 11, in combination with an optical system such as a lens 12 for concentrating the light rays emanating from source 11 and to project a sharp beam upon the object 12 to be tested or scanned. In the example illustrated, we have shown a cylinder 13 such as used in scanning devices for electric picture transmission well known in the art. The picture to be transmitted is mounted on the cylinder which is rotated and at the same time displaced in an axial direction in such a manner that the individual elementary portions of the picture are scanned in succession along a spiral trace. It is obvious that in place of the scanning cylinder indicated in the drawing, any other object may be provided such as in the case of sorting and selecting systems in which objects of the same nature such as cigars and the like are passed in succession in front of the scanning beam by means of a conveyor band and subjected to a testing action. It is furthermore understood that a continuous strip of material, such as paper may be passed in front of the scanning beam provided with dark cutting marks at definite intervals from each other for operating a cutting mechanism.

In accordance with the novel feature of our invention, we provide means, such as a chopping disc in the path of the light beam producing the illuminated spot 14 on the object under scanning.

This chopper serves for successively interrupting the scanning light beam and is arranged in such a manner that the light reflected from the object 13 is thrown upon the photo-electric cell 1.

In the example according to Figure 1, we have shown a chopper 15 rotating about its axis 16 and provided with circumferential teeth 17 being provided with a light reflecting surface and being bent downward to form a definite angle with the surface of the disc. The light reflecting surface may be obtained for instance by polishing, by varnishing or by painting with a white paint, as will be obvious.

In place of a circular chopping device, as illustrated, it is understood that any other well known type of mechanism may be provided for this purpose, such as an endless band or film or the like known in the art.

Figure 2:
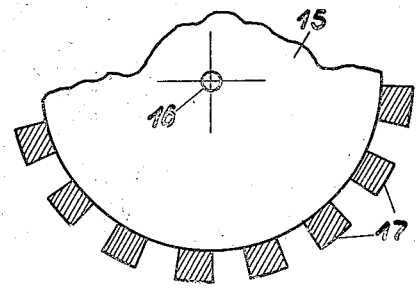
Figure 2 illustrates in an enlarged scale a top view of the novel type of scanning disc as used in the system according to Figure 1.

In Figure 2 the scanning disc 15 is shown in an enlarged fashion, the reflecting surface of the downward bent teeth being indicated by cross-hatching.

The operation of the device according to the invention, as shown by Figure 1 is as follows:

When the disc 15 is rotated at high speed by a suitable drive such as an electric motor, the teeth 17 will successively interrupt the scanning beam, thus producing a carrier current in the output of the photo-electric cell controlled by the amount of reflected light from the object or scanning element 14. By changing the position of the photo-electric device 1, which may be arranged movably as indicated by the arrows 18, exact equality of the amount of light reflected from a white point of the object 14 on the one hand and of the amount directly reflected from the teeth 17 may be secured. Thus, as will be readily seen, no current variations will occur in the circuit of the photo-electric device 1 and accordingly no controlling current applied to the tube 4, if the object or point 14 under scanning has a pre-determined degree of brightness. On the other hand, if a dark point or object 14 is subjected to the action of the scanning beam, such as for instance a printed mark on the surface of a strip of paper moving past the scanning beam, the aforementioned equality of the amount of light falling upon the device 1 will no longer prevail and a carrier current will be set-up in the photo-electric circuit.

The current established in the circuit of the photo-electric device serves to control the grid of the vacuum tube 4, whereby a corresponding change in the output circuit of the tube will take place, operating a relay or other output device.

If the system as described is used for picture transmission, the impulses obtained in the circuit of the photo-electric device are preferably used as a carrier frequency for the transmission, whereby a 100% modulation may be obtained in the amplifier connected to the system by proper adjustment of the grid resistance 7, to a value of some 100,000 ohms.

If the system is used for controlling a relay, we prefer to use the impulses produced in the photo-electric cell either for blocking the tube 4 or a separate tube to be coupled to the terminals 10 by means of a transformer and provided with a grid blocking condenser and grid leak resistance of a very high value (10 to 1000 megohms). By this means an extremely sensitive and accurate operation of the relay is secured.

Although the invention has been described with reference to the specific example shown in the drawing, it is obvious that the new technical features are subject to many variations and modulations without deviating from the principle described hereinbefore. Accordingly, we wish it to be understood that the specification and drawing should be regarded as illustrative of the broader principle underlying the invention as expressed in the ensuing claims.

What we claim is:

1. In a photo-electric system, an object to be explored, a source of light producing an exploring beam; a photo-electric device controlled by said beam in accordance with the amount of light reflected from said object, a rotating disc chopper arranged between said source and said object having circumferential teeth in the path of the exploring beam for producing periodic interruptions thereof; said teeth being provided with a light reflecting surface; and means whereby the light reflected from said teeth is directly applied to said photo-electric device.

2. In a photo-electric system, an object to be explored; a source of light for producing an exploring beam; a photo-electric device; means for controlling said device in accordance with the amount of light reflected from said object being explored by said beam; a rotating chopper disc arranged between said source and said object having light reflecting circumferential teeth arranged in the path of said exploring beam to produce periodic interruptions thereof; said teeth of said chopper being bent to include a specific angle with a surface of the chopping disc for directly reflecting said beam upon said photo-electric device during the interrupting periods.

3. In a photoelectric system; an object to be explored; a source of light for producing an exploring beam; a photo-electric device; means for controlling said device in accordance with the degree of brightness of said object; a light chopper arranged intermediate said source and said object having alternate opening and obstructing elements for periodically interrupting said beam, said obstructing elements having a light reflecting surface for directly reflecting said beam upon said photoelectric device during the interrupting periods.

4. In a photoelectric system; an object to be explored; a source of light for producing an exploring beam; a photoelectric device; means for controlling said device in accordance with the degree of brightness of said object under exploration constitute a continuously moving shutter arranged intermediate said source and said object having alternate light passing and light obstructing elements for periodically interrupting said beam, said obstructing elements being provided with a light reflecting surface for directly reflecting said exploring beam upon said photoelectric device during the obstructing periods by said shutter.

5. A photoelectric system comprising an object to be explored; a source of light producing an exploring beam impinged upon said object; a photoelectric device; means for controlling said device by said beam after being reflected from said object; a moving member arranged intermediate said source and said object having alternate light passing and light obstructing elements for periodically interrupting the path of said beam to said object, said obstructing elements having a light reflecting surface for reflecting and directing said beam upon said photoelectric device during the periods of interruption of the light path to said object.

6. A photoelectric system comprising an object to be explored; a source of light producing an exploring beam; a photoelectric device; means for controlling said device in accordance with the amount of light reflected from said object being explored; a continuously moving shutter arranged intermediate said source and said object having alternate light passing and light obstructing elements for periodically interrupting said beam, said obstructing elements having a light reflecting surface for reflecting and directing said beam upon said photoelectric device.

7. A photoelectric system comprising an object to be explored, a source for producing an exploring beam of light, a photoelectric device controlled by said beam, means arranged between said source and said object having alternate light passing and light obstructing elements for periodically directing said beam upon said object to produce a pulsating current response in said photoelectric device, and further means comprising a light reflecting surface for each of said elements for reflecting said beam directly upon said photoelectric device when it is not affecting said object.

8. In combination with a photoelectric system, an object to be explored; a source of light producing an exploring beam impinged upon said object and illuminating a finite area thereon; a photoelectric device controlled by said beam reflected from said object; a continuously moving member arranged between said source and said object having alternate light passing and light obstructing elements for periodically interrupting the path of said beam to said object; and means whereby said light obstructing elements reflect said beam onto said photoelectric device whereby said photoelectric device is controlled by said beam in alternate succession by reflection from said object and from said moving member, respectively.

HEINRICH H. GEFFCKEN.
HANS R. RICHTER.